Patented July 24, 1934

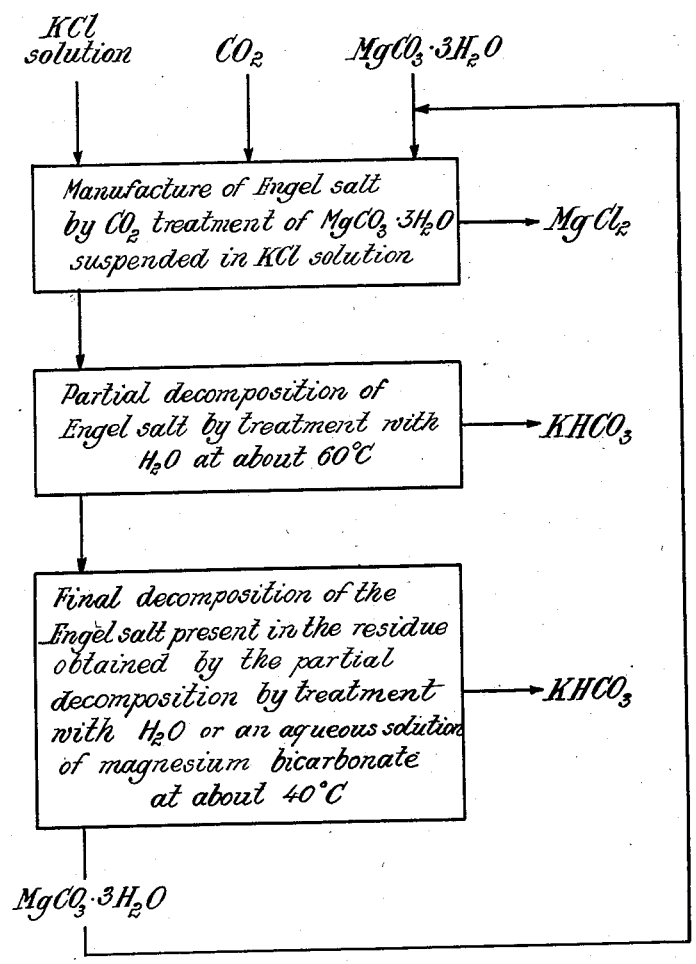

UNITED STATES PATENT OFFICE 1,967,630

MAKING POTASSIUM BICARBONATE AND MAGNESIUM CARBONATE TRIHYDRATE FROM ENGEL SALT

Friedrich Rüsberg, Berlin-Niederschöneweide, Germany, assignor to Kali-Chemie Aktiengesellschaft, Berlin, Germany Application August 10, 1932, Serial No. 628,259
In Germany September 29, 1931

8 Claims. (Cl. 23—64)

This invention relates to the manufacture of potassium carbonate from potassium salts of strong mineral acids and magnesium carbonate trihydrate.

It is known to make potassium carbonate by treating with carbon dioxide a suspension of magnesium carbonate trihydrate in an aqueous solution of potassium chloride, whereby a crystal water containing double salt of potassium bicarbonate and magnesium carbonate, named Engel salt, precipitates, which on decomposition with water at raised temperature furnishes an aqueous solution of potassium bicarbonate, which may contain potassium carbonate and solid magnesium bicarbonate trihydrate, which is used again for the manufacture of potassium carbonate from fresh potassium chloride. This process, which is called Engel-Precht method, is supposed to take place according to the following equations:

1. $2KCl + 3(MgCO_3.3H_2O) + CO_2 + H_2O =$
$2(KHCO_3.MgCO_3.4H_2O) + MgCl_2 + H_2O$;
2. $KHCO_3.MgCO_3.4H_2O + H_2O =$
$MgCO_3.3H_2O + KHCO_3 + 2H_2O$.

The decomposition of the Engel salt with water is usually carried out by introducing the double salt, which is difficultly soluble in water, into the corresponding amount of cold water and then heating the mixture or by introducing the double salt into the necessary amount of previously heated water. This decomposition treatment has considerable disadvantages. If the treatment of the double salt with heated or hot water is carried out long enough, to decompose the entire amount of double salt, which is necessary, in order to obtain good yields in potassium carbonate, basic magnesium compounds are formed; when reusing the magnesium carbonate trihydrate, obtained by the decomposition of the double salt, for the formation of fresh double salt, sludges are formed, the formation of which is due to the presence of basic magnesium compounds in the decomposition trihydrate and the presence of which makes considerable difficulties in the preparation, separation and handling of the double salt. Moreover the trihydrate of magnesium carbonate, which is used in a cycle, has to be regenerated very often.

The main object of the invention is to provide for a method for decomposing Engel salt with water, by which the formation of basic magnesium compounds is reduced and consequently the formation of undesirable sludges is diminished in the manufacture of fresh Engel salt with the magnesium carbonate trihydrate obtained by decomposition of Engel salt.

A further object of the invention is to provide for a method for decomposing Engel salt with water in such a way, that the magnesium carbonate trihydrate obtained by the decomposition is as pure as possible, in order to avoid the regeneration or to reduce the number of regeneration of the decomposition trihydrate, which is used in a cycle.

According to the invention the decomposition of Engel salt with water is carried out in several stages at superatmospheric temperatures descending from stage to stage. Two stages are generally sufficient, to obtain the desired result, that is good yields of potassium carbonate and a magnesium carbonate trihydrate free from or poor in basic magnesium compounds. According to a preferred embodiment of the invention the different stages of the decomposition of Engel salt with water are carried out in presence of water soluble magnesium bicarbonate, the presence of which appears to suppress the formation of basic magnesium compounds. It is not necessary, that magnesium bicarbonate is present in the first decomposition stage, although it is preferred, especially when using the liquid obtained by the decomposition in the second and last stage or the wash water of the solid decomposition residue of the second and last stage for or in the first decomposition stage of fresh Engel salt. The process according to the invention, when carried out in two stages, may be illustrated by the following equations; the invention is, however, not restricted to a procedure according to these equations, as other ratios of decomposition are just as well possible.

*First stage*

$3(KHCO_3.MgCO_3.4H_2O) + H_2O = 2KHCO_3 + 3H_2O + 2MgCO_3.3H_2O + KHCO_3.MgCO_3.4H_2O$.

*Second stage*

$2MgCO_3.3H_2O + KHCO_3.MgCO_3.4H_2O + H_2O = KHCO_3 + 2H_2O + 3MgCO_3.3H_2O$

*Examples*

1. 1000 kg of Engel salt with 20% of potassium carbonate in the form of potassium bicarbonate are introduced while stirring into 3,3 cbm of wash water of previous operations, said wash water containing 25 kg of potassium carbonate per cbm present as potassium bicarbonate. The suspension obtained is quickly heated to about 60° C. and kept at this temperature for about 10 minutes. Then the solution of potassium bicarbonate, which generally contains potassium carbonate, is separated from the solid residue by filtration. The filter cake is suspended in 2 cbm of water by stirring and the suspension obtained heated to about 40° C. and kept at this temperature for about 15 minutes, after which the residue is separated from the solution by filtration. The filter cake is washed with 0,8 cbm water of about 40° C.

The solutions obtained in the two decomposition stages are worked up to potassium carbonate by evaporation. The magnesium carbonate trihydrate obtained is reused for the manufacture of Engel salt from fresh potassium chloride or potassium sulfate, practically no sludge being formed.

The yield in potassium carbonate is practically quantitative, as the remaining magnesium carbonate trihydrate contains only 0,05% $K_2CO_3$ as bicarbonate and about 14% MgO. In the first decomposition stage 2,9 cbm solution with such amounts of potassium bicarbonate are obtained, as corresponds to 72 kg $K_2CO_3$ per cbm, whereas the second stage and the washing of the residue furnish 3,1 cbm solution with such amounts of potassium bicarbonate as corresponds to 24 kg $K_2CO_3$ per cbm.

2. 1000 kg of the same Engel salt as in Example 1 are suspended while stirring in 3,1 cbm of second stage wash water with 25,8 kg of potassium carbonate as bicarbonate and about 1,7 kg of magnesium oxide as magnesium bicarbonate per cbm. The suspension is heated to about 60° C. and kept at this temperature for about 10 minutes and then filtered. The filter cake is introduced into 2 cbm of an aqueous solution of magnesium bicarbonate with 9 kg of MgO per cbm and having a temperature of 40° C. This temperature is kept for about 15 minutes while stirring. The suspension is then filtered and the filter cake washed with 1 cbm of the same solution of magnesium bicarbonate of about 40° C. The washed cake consists of magnesium carbonate trihydrate with 14% MgO and only 0,1% $K_2CO_3$ and is reused in the production of fresh Engel salt.

The foregoing detailed examples have been given for clearness of understanding only, and no unnecessary limitations should be understood therefrom, but the appended claims should be construed as broadly as permissible in view of the prior art.

I claim:

1. A method for making potassium salts of carbonic acid and magnesium carbonate trihydrate from Engel salt which consists in partially decomposing the Engel salt by treatment with an aqueous liquid at superatmospheric temperature, separating the solution obtained from the solid residue, decomposing said solid residue by treatment with an aqueous liquid containing magnesium bicarbonate at a superatmospheric temperature below the temperature of the first decomposition step and separating the solution from the solid residue obtained.

2. A method for making potassium salts of carbonic acid and magnesium carbonate trihydrate from Engel salt which consists in partially decomposing the Engel salt by treatment with water at superatmospheric temperature, separating the solution obtained from the solid residue, decomposing said solid residue by treatment with an aqueous liquid containing magnesium bicarbonate at a superatmospheric temperature below the temperature of the first decomposition step and separating the solution from the solid residue obtained.

3. A method for making potassium salts of carbonic acid and magnesium carbonate trihydrate from Engel salt which consists in partially decomposing the Engel salt by treatment with an aqueous liquid containing magnesium bicarbonate at superatmospheric temperature, separating the solution obtained from the solid residue, decomposing said solid residue by treatment with an aqueous liquid containing magnesium bicarbonate at a superatmospheric temperature below the temperature of the first decomposition step and separating the solution from the solid residue obtained.

4. A method for making potassium salts of carbonic acid and magnesium carbonate trihydrate from Engel salt which consists in treating the Engel salt with water at about 60° C., separating the solution obtained from the residue, treating the residue with water at about 40° C., separating the solution from the residue and washing the residue with water.

5. A method for making potassium salts of carbonic acid and magnesium carbonate trihydrate from Engel salt which consists in treating the Engel salt with water at about 60° C., separating the solution obtained from the residue, treating the residue with an aqueous solution of magnesium bicarbonate at about 40° C., separating the solution from the residue and washing the residue with water.

6. A method for making potassium salts of carbonic acid and magnesium carbonate trihydrate from Engel salt which consists in treating the Engel salt with an aqueous solution of magnesium bicarbonate at about 60° C., separating the solution obtained from the residue, treating the residue with an aqueous solution of magnesium bicarbonate at about 40° C., separating the solution from the residue and washing the residue with water.

7. A method according to claim 4, in which the aqueous liquid obtained by washing the residue with water is used instead of water for the treatment of the Engel salt at about 60° C.

8. A method according to claim 6, in which the second residue is washed with an aqueous solution of magnesium bicarbonate instead of water and in which the washing liquid thereby obtained is used for the treatment of the Engel salt at about 60° C.

FRIEDRICH RÜSBERG.